US012271986B1

(12) United States Patent
Kumar et al.

(10) Patent No.: US 12,271,986 B1
(45) Date of Patent: Apr. 8, 2025

(54) SYSTEMS AND METHODS FOR GENERATING AN AUTONOMOUS BOT THAT REPLICATES SPEECH CHARACTERISTICS, VISUAL EXPRESSIONS, AND ACTIONS OF A PROFESSIONAL

(71) Applicant: PEAKSPAN CAPITAL MANAGEMENT, LLC, New York, NY (US)

(72) Inventors: Vikas Kumar, Livingston, NJ (US); Philip Alexandrov, New York, NY (US); Evan Kessler, Simpsonville, SC (US); Philip Dur, Burlingame, CA (US)

(73) Assignee: PEAKSPAN CAPITAL MANAGEMENT, LLC, New York, NY (US)

( * ) Notice: Subject to any disclaimer, the term of this patent is extended or adjusted under 35 U.S.C. 154(b) by 0 days.

(21) Appl. No.: 18/983,803

(22) Filed: Dec. 17, 2024

(51) Int. Cl.
*G06T 13/20* (2011.01)
*G06Q 10/109* (2023.01)

(52) U.S. Cl.
CPC ......... *G06T 13/205* (2013.01); *G06Q 10/109* (2013.01)

(58) Field of Classification Search
CPC .............................. G06Q 10/109; G06T 13/205
See application file for complete search history.

(56) References Cited

U.S. PATENT DOCUMENTS

| 9,870,797 B1* | 1/2018 | Tseytlin | G11B 27/031 |
| 2020/0258047 A1* | 8/2020 | Randall | G06N 3/006 |
| 2023/0123893 A1* | 4/2023 | Marggraff | H04L 12/1831 709/204 |
| 2023/0145369 A1* | 5/2023 | McIntyre-Kirwin | G06F 3/011 345/473 |
| 2023/0261890 A1* | 8/2023 | Religa | G06Q 10/10 709/204 |
| 2023/0412414 A1* | 12/2023 | Wang | G10L 15/26 |
| 2024/0054548 A1* | 2/2024 | Catone | G06Q 10/1095 |
| 2024/0221753 A1* | 7/2024 | Garg | G10L 19/012 |
| 2024/0303891 A1* | 9/2024 | McIntyre-Kirwin | G06T 13/205 |
| 2025/0039336 A1* | 1/2025 | Lee | H04N 7/155 |
| 2025/0056078 A1* | 2/2025 | Hsu | G06T 13/00 |

* cited by examiner

*Primary Examiner* — Phi Hoang
(74) *Attorney, Agent, or Firm* — Ansari Katiraei LLP; Arman Katiraei; Sadiq Ansari (57) ABSTRACT

Disclosed is a system and associated methods for generating an autonomous bot that replicates speech characteristics, visual expressions, and actions of a professional in order to further relationships established by the professional in meetings that the professional is unavailable for. The system monitors meetings involving the professional at different stages of a workflow, and classifies the workflow stage associated with each meeting. The system models content, speech characteristics, and visual expressions expressed by the professional at each workflow stage based on commonality that is detected in a different set of meetings classified to a corresponding workflow stage. The modeling is used to generate an autonomous bot as a surrogate for the professional in a meeting that the professional is unavailable for. The autonomous bot interacts with other meeting participants by replicating the content, speech characteristics, and visual expressions of the professional throughout the meeting based on the modeling.

20 Claims, 7 Drawing Sheets

SYSTEMS AND METHODS FOR GENERATING AN AUTONOMOUS BOT THAT REPLICATES SPEECH CHARACTERISTICS, VISUAL EXPRESSIONS, AND ACTIONS OF A PROFESSIONAL

TECHNICAL FIELD

The present disclosure relates to the field of autonomous bots and deepfake artificial intelligence (AI). More specifically, the present disclosure relates to replicating the speech characteristics, visual expressions, and actions of a professional in order to replace the professional in audio and/or video meetings.

BACKGROUND

Bots have been created to replace humans for basic scripted tasks. The bots follow a series of scripted or planned paths based on human answers to presented questions. These bots are not autonomous since they cannot react to unscripted responses or make dynamic decisions based on a current request and/or previous activity in a current or past conversation.

Artificial intelligence (AI) has removed some of these bot limitations. For instance, a bot may be trained according to a model of best practices and the bot may dynamically generate a response to a question based on the best practices model.

However, for important matters, humans feel more comfortable engaging or interacting with other humans rather than bots regardless of the bot's effectiveness. Specifically, there is no comradery or relationship that is established between the human and the bot when the two interact. Each time the human contacts the bot, the bot will respond with the same programmed tone and behavior as if the human is contacting the bot for the first time or with the same tone and behavior it has when interacting with all humans. The comradery or relationship is an important element in advancing certain business objectives and/or when dealing with more important matters where a personalized human touch or level-of-comfort is needed.

DETAILED DESCRIPTION OF PREFERRED EMBODIMENTS

Provided are systems and methods for generating an autonomous bot that replicates speech characteristics, visual expressions, and actions of a professional. In some embodiments, the autonomous bot may seamlessly interact with other humans that have an established relationship with the professional without the other humans realizing that they are interacting with the bot instead of the professional. In some such embodiments, the autonomous bot assumes the mannerisms and behaviors of the professional, and adapts the mannerisms and behaviors over the course of a relationship and multiple meetings based on responses of the humans. Accordingly, the autonomous bot establishes and continues the relationship through the modeled speech characteristics, visual expressions, and actions of the professional so that the humans are more comfortable in advancing business objectives or performing important matters that they otherwise would not if knowingly interacting with a bot rather than another human. In summary, the autonomous bot mimics the decision-making of the professional to generate content in real-time as a conversation with one or more humans unfolds and the conversation advances through one or more stages of a workflow based on current interactions between the humans and the autonomous post and past interactions in prior stages of the workflow between the humans, the professional, and/or the autonomous bot. The autonomous bot verbally conveys the generated content with the same voice, wording, sentence structure, tone, emotion, and/or other speech characteristics as the professional, and visually presents a digital replication of the professional that conveys the generated content with the same visual expressions as the professional when the professional is unavailable to participate in the conversation or associated meeting.

An emulation system trains the autonomous bot on speech characteristics of the professional, on visual expressions and mannerisms of the professional, and on decision-making of the professional when confronted with different questions or choices at different stages of a workflow. The emulation system generates one or more artificial intelligence (AI) models that execute simultaneously in order to generate the real-time content for the autonomous bot, the speech characteristics for audibly expressing the content, and the visual expressions with which the visual representation of the professional presents the content. The execution of the AI models cause the autonomous bot to realistically mimic or mirror in real-time the speech characteristics, visual expressions, and actions exhibited by the modeled professional in similar or related scenarios.

The AI models and the output of the autonomous bot establish or continue a relationship with a particular human in the same manner as the professional by emulating how the professional engages with that particular human or other humans that have similar demeanors or behaviors as the particular human and by accounting for past interactions between the professional, the autonomous bot, and the particular bot. In other words, the autonomous bot does not generate the same speech characteristics, visual expressions, and actions when interacting with different humans at the same stage of a workflow. Instead, the autonomous bot customizes its speech characteristics, visual expressions, and actions based on different modeled speech characteristics, visual expressions, and actions that the professional has when engaging with different humans with different demeanors or behaviors and/or based on a different established relationship with each of the humans. The emulation system may track each relationship with a different human in order to customize the models for the specific demeanor or behavior of the particular human in prior conversations with the autonomous bot or the professional and how the speech characteristics, visual expressions, and/or decision-making of the professional changes in response to the specific demeanor or behavior or how the demeanor or behavior of the particular human changes in response to certain speech characteristics, visual expressions, and actions of the autonomous bot or the professional in prior conversations.

Figure 1:
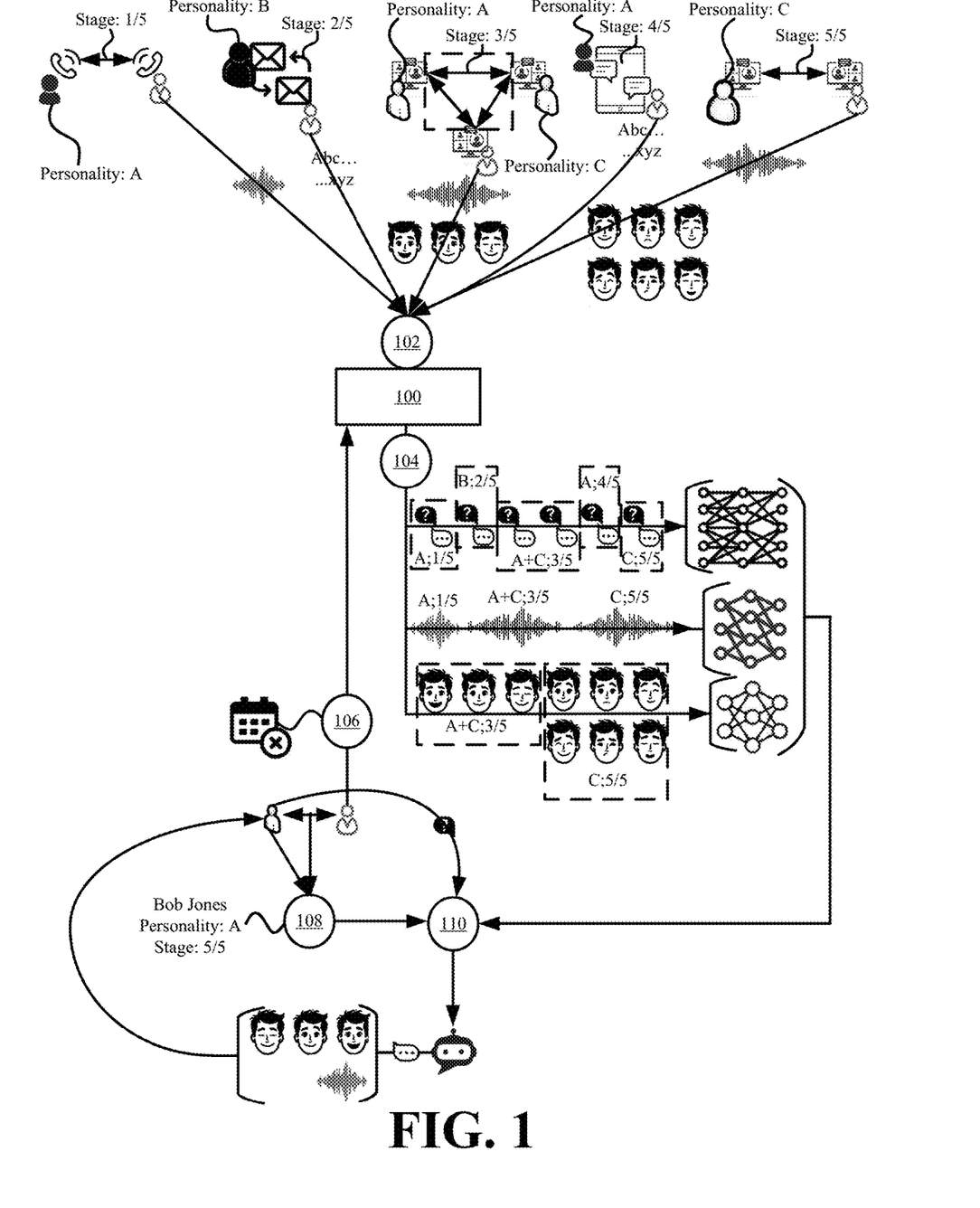
FIG. 1 illustrates an example of generating an autonomous bot with speech characteristics, visual expressions, and actions that replicate those of a professional in accordance with some embodiments presented herein.

FIG. 1 illustrates an example of generating the autonomous bot with speech characteristics, visual expressions, and actions that replicate those of a professional in accordance with some embodiments presented herein. Emulation system 100 records or tracks (at 102) the speech characteristics, visual expressions, and actions of the professional in meetings or conversations with different humans at different stages of a workflow. For instance, emulation system 100 receives recordings of the audio and video feeds, transcripts, and/or message exchanges for the meetings or conversations.

Emulation system 100 uses a deep learning neural network to train (at 104) one or more models for the speech characteristics, visual expressions, and actions of the professional when interacting with different human personalities at each stage of the workflow. For instance, the workflow may be defined with an introductory stage, a presentation stage, a negotiation stage, and a follow-up stage. Each meeting or conversation may be classified to one of the workflow stages. Moreover, the personality of the other human participants in each meeting or conversation may be also classified. For instance, the professional may change their speech characteristics, visual expressions, and actions when speaking to someone who is aggressive versus someone who is passive or someone who is talkative versus someone who is taciturn. Emulation system 100 may classify the personalities of the other human participants in each meeting or conversation prior to training (at 104) the models for the speech characteristics, visual expressions, and actions of the professional.

Emulation system 100 receives (at 106) a request for a meeting with the professional that the professional is unable to attend. The professional may notify emulation system 100 that they are unable to participate in the meeting due to a conflict or other reason.

Emulation system 100 determines (at 108) that the meeting is directed to a specific stage of the workflow and determines (at 108) the other human participants of the meeting. Emulation system 100 determines (at 108) the specific workflow stage based on the subject, topic, or other description associated with the meeting or based on a last workflow stage completed in a prior meeting with the same human participants. Emulation system 100 determines (at 108) the other human participants based on the meeting guest list. For instance, the meeting may be associated with an invitation that includes the names, email addresses, or other identifiers of the other human participants.

Emulation system 100 generates (at 110) an autonomous bot for the meeting to replicate the modeled speech characteristics, visual expressions, and actions of the professional for the determined (at 108) specific workflow stage and the personalities of the determined (at 108) human participants. Specifically, emulation system 100 generates (at 110) the autonomous bot based on the models that were trained using the speech characteristics, visual expressions, and actions of the professional in other meetings at the same specific workflow stage involving other humans with the same personalities as those of the requested meeting.

Emulation system 100 uses the generated (at 110) autonomous bot as a surrogate for the human professional during the meeting. The autonomous bot interacts with the other human participants when questions are raised for the professional, the input of the professional is called upon during the meeting, or the professional directs or initiates the conversation. The autonomous bot interactions are conducted with the speech characteristics and visual expressions that the professional would use when interacting with other humans having the same personalities as the other meeting participants or are based on speech characteristics and visual expressions that the professional or autonomous bot exhibited in past meetings or conversations with the same human participants to mirror or continue building upon a relationship or level-of-comfort that was established in those past meetings or conversations. The actions performed by the autonomous bot include generating responses to questions posed by the other human participants, guiding the meeting, and otherwise participating in the meeting using the same pacing, decision-making, format, structure, tone, and word usage as the professional for the same specific workflow stage involving participants with the same personality types as the other meeting participants.

Figure 2:
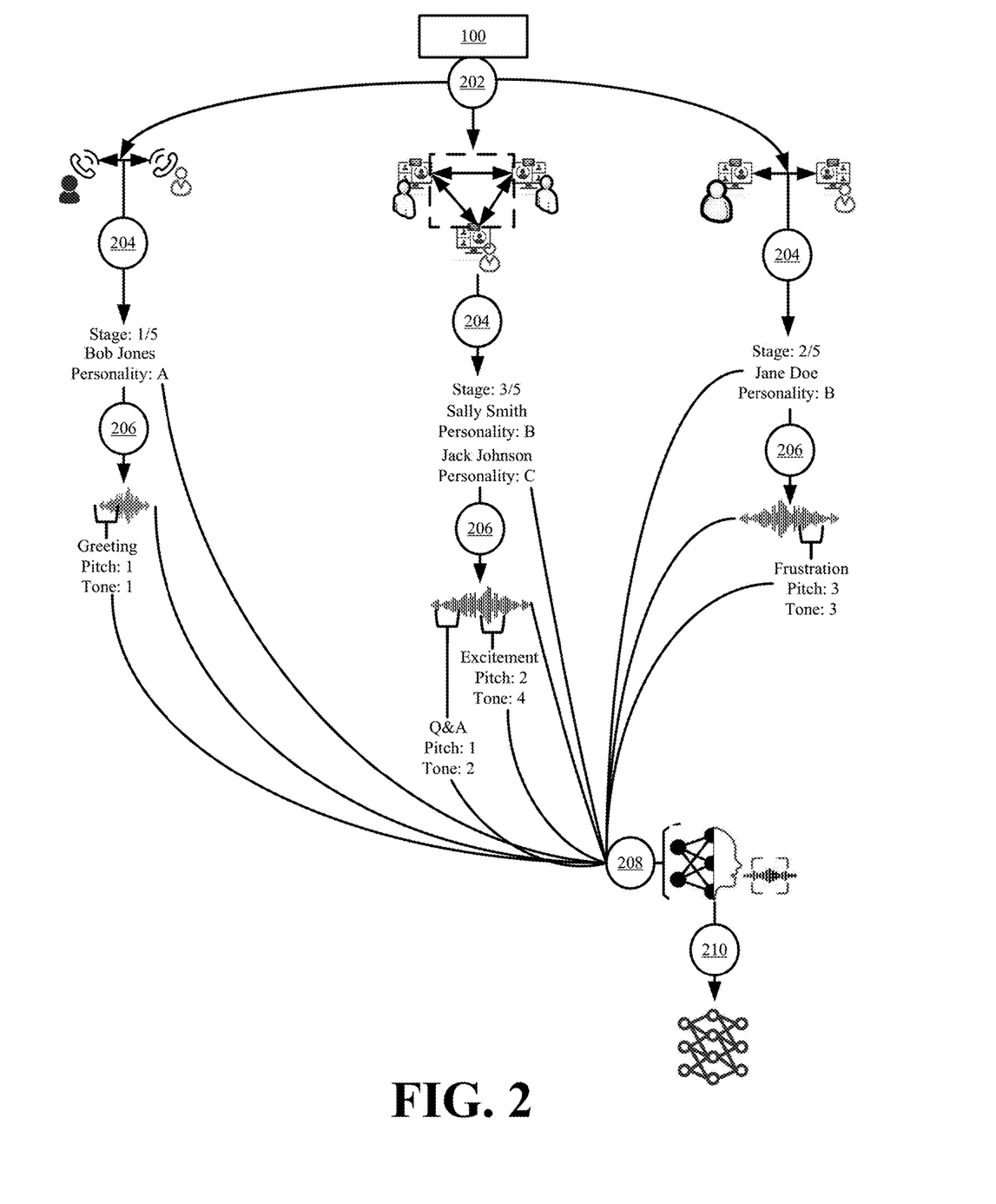
FIG. 2 illustrates an example of generating a voice clone model for a professional in accordance with some embodiments presented herein.

FIG. 2 illustrates an example of generating a voice clone model for a professional in accordance with some embodiments presented herein. The voice clone model naturally and dynamically simulates the professional's speech characteristics by capturing the nuances of how the professional communicates across varying emotional contexts (e.g., when expressing enthusiasm, doubt, inquiry, etc.), and expressing various content to humans with different personalities (e.g., gregarious, reserved, funny, shy, etc.).

Emulation system 100 generates an accurate voice clone of a professional based on recordings of the professional in various scenarios. The recordings may include formal and informal meetings that include the professional at different workflow stages engaging with other humans having different personalities. The recordings capture the range of speech characteristics exhibited by the professional in different scenarios, when presenting different content or responses, and/or when experiencing different ranges of emotions (e.g., calm, excited, concerned, etc.). The recordings serve as the training data for the voice clone model. Accordingly, emulation system 100 accesses (at 202) the audio from different meetings that the professional participates in. In some embodiments, emulation system 100 accesses (at 202) the audio as the meetings take place. In some other embodiments, emulation system 100 accesses (at 202) the audio by retrieving recordings after the meetings have concluded.

Emulation system 100 classifies (at 204) each recording with tags that indicate the workflow context and/or the participant context. The workflow context specifies the particular stage of a workflow implicated in the recording. Emulation system 100 may determine the workflow context based on previous conversations the professional has had with the same conversation participants (e.g., first call is associated with an introduction workflow stage, second call is associated with a demonstration workflow stage, etc.), the title or description associated with the invitation for the conversation, and/or based on detected topics or subject matter of the conversation. The participant context identifies the other human participants in the recording with the professional. In some embodiments, the participants may be identified directly by a name, email address, or other unique identifier. The unique identifier may be obtained from the meeting invitation or login information that each participant provides in order to join the meeting. The participants may also be identified by matching the voice signatures within each recording. In some embodiments, the participants may be identified indirectly based on their personality. For instance, emulation system 100 may analyze the tone, word usage, speaking rate, and/or other speech characteristics of the other participants in order to assign a classification for the participant personality. Examples of some personality classifications may include aggressive, passive, inquisitive, quiet, personable, disengaged, etc.

Emulation system 100 annotates (at 206) the recordings with emotional context. Emulation system 100 analyzes audio segments from each recording to understand how the professional's tone shifts depending on the subject, mood, or personality of the other conversation participants. Emulation system 100 provides the emotional context to the audio segments based on the detected tonal shifts. The emotional context associated with an audio segment represents how emotions alter the professional's voice during certain moments and assist in training the model to express the appropriate tone for different scenarios.

Emulation system 100 provides (at 208) the audio with the classifications (at 204) and annotations (at 206) as training data for a neural network. The neural network groups the recordings with common workflow and participant context. For instance, the neural network identifies the set of recordings that involves a particular stage of the workflow and human participants with a common or similar personality. The neural network isolates the voice of the professional in each set or group of recordings by matching audio segments from the recordings to a voice sample of the professional. The neural network detects patterns in the speech characteristics of the isolated professional voice within a set or group of recordings based on the annotated (at 206) emotional context and based on analysis of the isolated professional voice. The detected patterns may include the tone, speaking rate, word usage, intonation, accent, pitch, and/or other characteristics of the professional's voice that occurs with a certain frequency or in a threshold percentage of the recordings with the common classifications. In some embodiments, the neural network links the detected patterns to specific triggering events. For instance, the neural network determines the triggering events based on a particular pattern recurring with a high frequency at a particular point in a conversation (e.g., introduction, conclusion, during a demonstration, when negotiating pricing, etc.) or in response to activity of another human participant (e.g., responding to a particular question or question type, interruption, change in the participant personality, a particular spoken word or phrase, etc.).

Emulation system 100 receives (at 210) a voice clone model that is generated by the neural network. The voice clone model may be defined as a set of vectors. Each vector of the set of vectors may include a connected set of neurons. The connected set of neurons represent the classifications and triggering events that are associated with or linked to a particular pattern of speech characteristics exhibited by the professional in recordings with those classifications and triggering events.

Emulation system 100 uses the voice clone model to replicate the professional's speech characteristics at different points in a conversation and/or in response to different triggering events occurring in conversations involving specific workflow stages and specific participants or participant personalities. Specifically, the voice clone model is used for AI generation of the autonomous bot audio. The AI generated audio may be played back in an audio only meeting or in a video and audio meeting where the autonomous bot serves as a surrogate for the professional.

Figure 3:
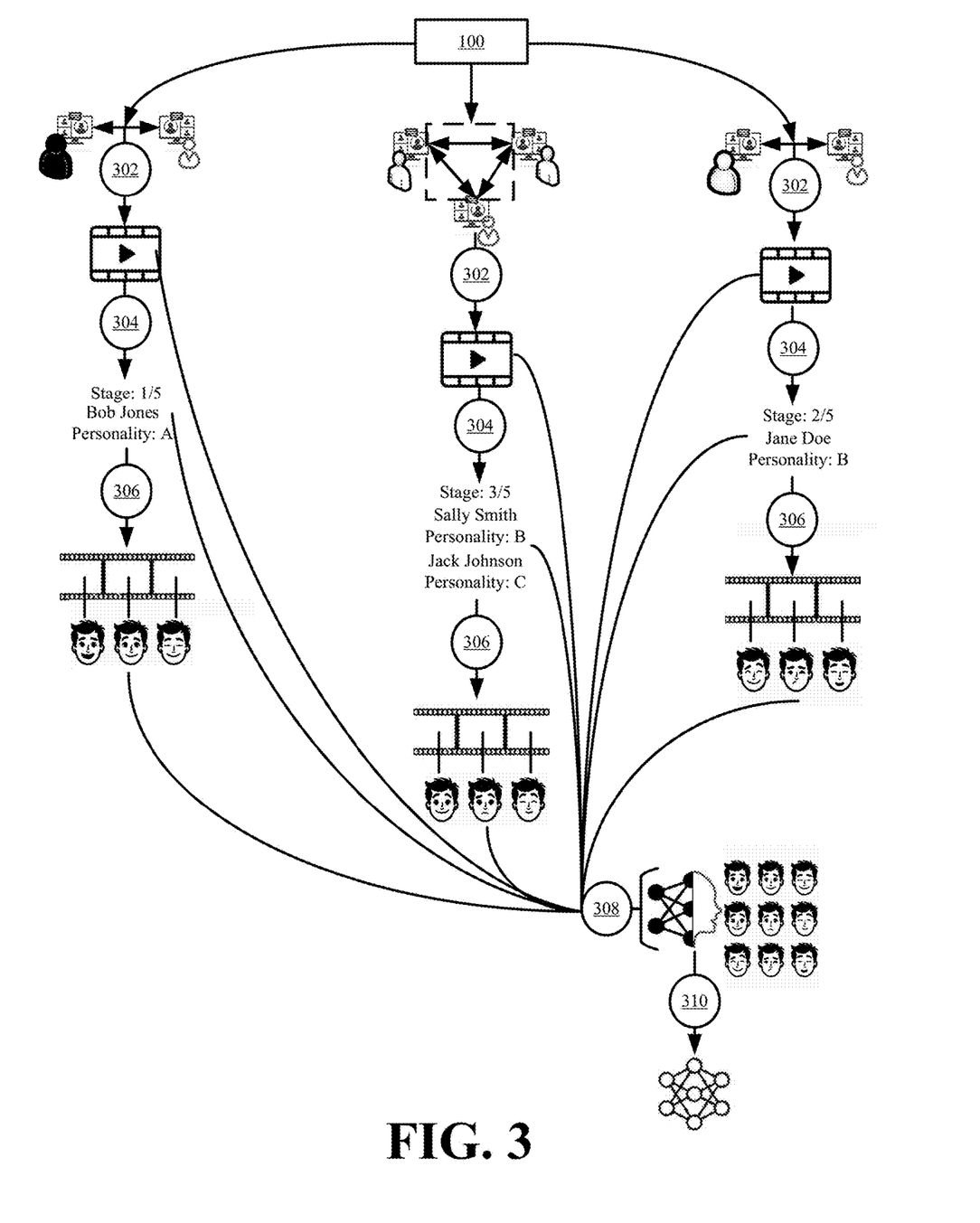
FIG. 3 illustrates an example of generating the deep fake clone model for a professional in accordance with some embodiments presented herein.

Emulation system 100 uses a deep fake clone model to create a dynamic lifelike or realistic representation of the professional in a video meeting. The generated representation replicates the visual appearance of the professional with accurate visual expressions, gestures, and body language for different AI generated speech and for real-time visual responses to different expressions and/or interactions of other human participants in the video meeting. For instance, the professional may visually indicate agreement with a specific nodding of their head, indicate surprise with a specific raising of the eyebrows, or use specific hand gestures for emphasis or when talking with specific speech characteristics. The deep fake clone model generates an autonomous bot that is a visual match to the professional and that is animated to replicate the specific nodding, specific raising of the eyebrows, specific hand gestures, and/or other visual expressions of the professional in response to real-time audio cues, visual cues, and speech from other participants in a video meeting and in response to real-time content that is generated for the autonomous bot.

FIG. 3 illustrates an example of generating the deep fake clone model for the professional in accordance with some embodiments presented herein. Emulation system 100 retrieves (at 302) recordings of video meetings that the professional participates in. The recordings contain a comprehensive range of video footage showing the professional in various formal and informal settings and/or engaging with other humans having different personalities at different workflow stages. The recordings capture the facial expressions, gestures, body language, and other visual expression exhibited by the professional when experiencing different ranges of emotions, speaking certain words or phrases at different points in a conversation or at different workflow stages, or reacting to other human participants with the different personalities. The recordings serve as the training data for the deep fake clone model.

As with the training of the voice clone model, emulation system 100 classifies (at 304) each recording with tags that indicate the workflow context and/or the participant context. The classification (at 304) includes identifying the workflow stage that is implicated in a recording and the other participants or personalities detected for the other participants in the recording.

Emulation system 100 annotates (at 306) segments of the recordings where certain visual expressions are exhibited with identifiers that identify the exhibited visual expression. Emulation system 100 analyzes the recordings for images of the professional or may analyze a video stream or video feed of the professional. Emulation system 100 monitors the visual expressions of the professional, and annotates (at 306) a segment where the visual expression of the professional changes or the visual expression of the professional matches a recognized visual expression with a tag or label that indicates the detected visual expression (e.g., affirmative head node, shoulder shrug, raised eyebrow, hand gesturing, etc.).

Emulation system 100 provides (at 308) the recordings with the classifications (at 304) and annotations (at 306) as training data for a neural network. The neural network groups the recordings with common workflow and participant context, and isolates images of the professional in each set or group of recordings by matching the images from the recordings to an image of the professional. The neural network detects patterns in the professional's visual expressions within a set or group of recordings. The detected patterns may include visual expressions that the professional repeats or commonly conveys in video meetings with the common classifications. In some embodiments, the neural network links the detected patterns to specific triggering events. In some such embodiments, the neural network determines the one or more events that repeatedly or frequently precede a visual expression exhibited by the professional or actions by the professional that are repeatedly or frequently occur at the same time as the detected pattern of visual expressions. The events may include actions, visual expressions, or words spoken by other meeting participants and/or specific times or activity within a video meeting (e.g., greeting, conclusion, presentation, etc.). For instance, the professional may exhibit a first visual expression in a threshold percentage of video meetings immediately after another meeting participant asks a specific type of question (e.g., "what benefits do you have over your competition?") and may exhibit a second visual expression in a threshold percentage of video meetings when the professional speaks certain phrases or has certain speech characteristics in their voice (e.g., providing a greeting to the other meeting participants).

Emulation system 100 receives (at 310) a deep fake clone model that is generated by the neural network. The deep fake clone model may be defined as a set of vectors with each vector being represented by a connected set of neurons. The connected set of neurons in the deep fake clone model represent the classifications and triggering events that are associated with or linked to a particular pattern of visual expressions exhibited by the professional in recordings with those classifications and triggering events. Emulation system 100 generates a visual clone of the professional to present in video meetings that the professional is unable to attend with the visual clone dynamically replicating in real-time the visual expressions in an active video meeting that the professional routinely exhibits in similar situations or scenarios in past video meetings and/or the recordings used as training data for the deep fake clone model.

Figure 4:
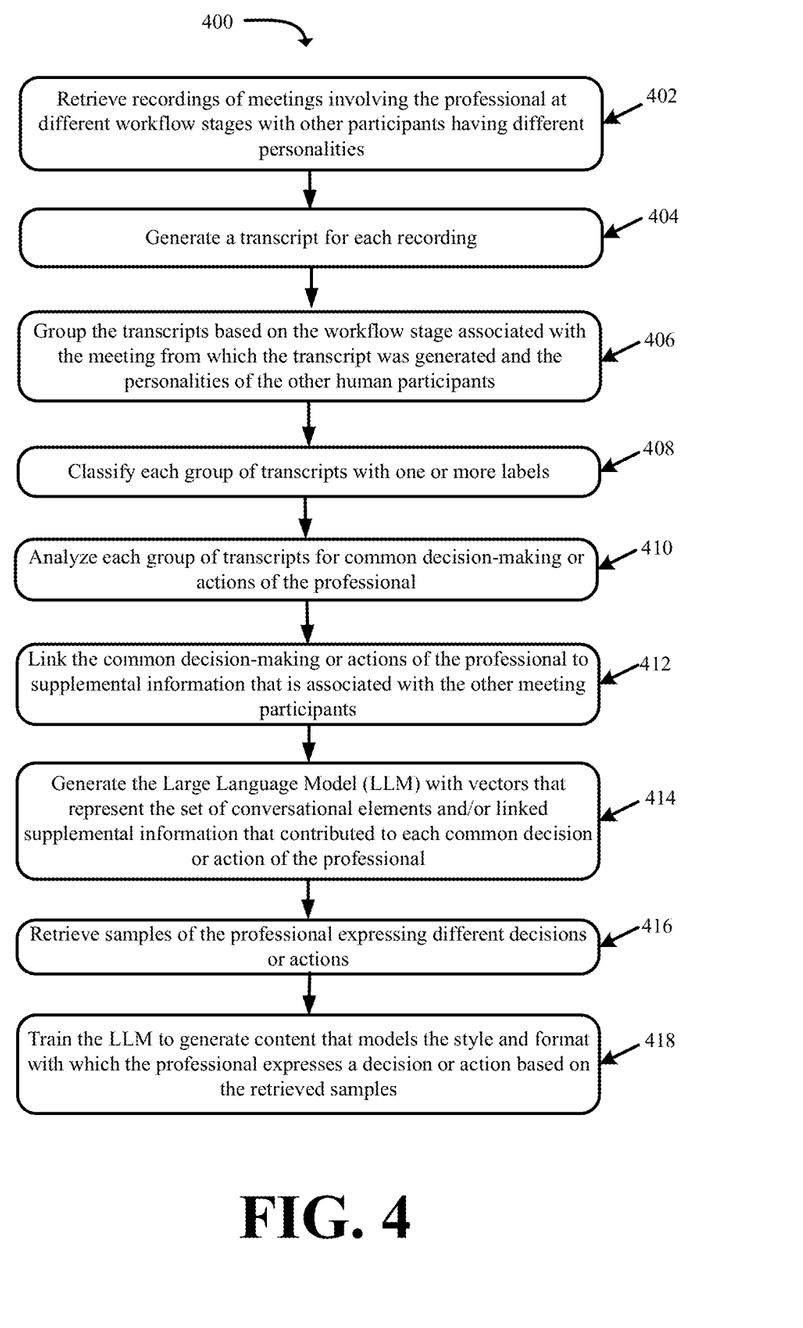
FIG. 4 presents a process for training a LLM for replicating decision-making and/or actions of a professional in accordance with some embodiments presented herein.

In some embodiments, emulation system 100 uses a third generative AI model to replicate the decision-making of the professional in real-time and to generate the content that is conveyed through the autonomous bot via the replicated speech characteristics generated through the voice clone model and/or the visual expressions generated through the deep fake model. In some such embodiments, the third generative AI model is a Large Language Model (LLM) that is trained to mimic how the professional thinks, reacts, and responds during different workflow stages with one or more other human participants having different personalities. For instance, the professional may provide a direct concise response to a particular question posed by a first participant with a verbose personality and may provide a lengthy detailed response to the same particular question posed by a second participant with a taciturn personality. The LLM accounts for the personalities of the other meeting participants in generating the response to the same particular question for the autonomous bot.

FIG. 4 presents a process 400 for training a LLM for replicating decision-making and/or actions of a specific professional in accordance with some embodiments presented herein. Process 400 is implemented by emulation system 100. Emulation system 100 includes one or more machines or devices with processor, memory, storage, network, and/or other hardware resources that are configured to generate and present the autonomous bot as a surrogate for the human professional in meetings that the human professional is unable to attend. Specifically, emulation system 100 generates the autonomous bot to replicate the speech characteristics, visual expressions, and actions of the human professional so that other meeting participants are unaware that they are interacting with the autonomous bot rather than the human professional.

Process 400 includes receiving (at 402) recordings of meetings involving the professional at different workflow stages with other participants having different personalities. The recordings include at least one audio stream and may also include one or more video streams that are synchronized with the at least one audio stream.

Process 400 includes generating (at 404) a transcript for each recording. Emulation system 100 may use a speech-to-text convertor to generate (at 404) the transcripts. The transcripts may be annotated to identify which speaker spoke which words in the transcript. Voice recognition software may be used to isolate and differentiate the speech of the professional from the speech of other meeting participants.

Process 400 includes grouping (at 406) the transcripts based on the workflow stage associated with the meeting from which the transcript was generated and the personalities of the other human participants. Accordingly, emulation system 100 groups (at 406) each transcript into a set that includes transcripts from other meetings involving the same workflow stage and other participants with the same or similar personalities.

Process 400 includes classifying (at 408) each group of transcripts with one or more labels. The classification (at 408) and labels identify the workflow stage associated with each group of transcripts and/or the personalities of the other meeting participants.

Process 400 includes analyzing (at 410) each group of transcripts for common decision-making or actions of the professional. In some embodiments, the analysis (at 410) includes identifying typical or recurring conversational patterns of the professional for meetings at a particular workflow stage with other participants having specific personality traits that the professional modifies their decision-making or actions to suit. In some embodiments, the analysis (at 410) includes identifying common or recurring questions that the professional asks and/or answers that the professional provides in response to similar questions posed by the other meeting participants. In some embodiments, the analysis (at 410) includes detecting common or recurring topics, points-of-interest, and/or subject matter discussed by the professional in the grouped set of meetings. In some such embodiments, the analysis (at 410) includes annotating patterns in conversation structure in order to detect patterns for how the professional transitions between topics and/or probes for information that is relevant to the particular workflow stage. Other commonality in the decision-making or actions taken by the professional may be detected through tone and/or intent analysis. The tone and/or intent analysis may be performed independent of or in combination with the transcript analysis, and involves determining a pattern with which the professional shifts tone when discussing certain topics or changes topics.

Process 400 includes linking (at 412) the common decision-making or actions of the professional to supplemental information that is associated with the other meeting participants. The supplemental information may include background information about the meeting participants or the company that they represent. The background information may include the business sector, their products, competitors, recent news related to the meeting participants, their company, or the sector they operate in, and/or discussions and outcomes from prior meetings or conversations with the other meeting participants.

Process 400 includes generating (at 414) the LLM with vectors that represent the set of conversational elements and/or linked (at 412) supplemental information that contributed to each common decision or action of the professional. For instance, a particular question posed by a participant that has a specific personality and that is associated with a business in a specific sector after the professional mentions an advantage they offer in that specific sector may be associated with a first action in the LLM, whereas the same particular question posed by another participant with a different personality who is associated with a business in a different sector after the professional mentions an advantage they offer in that different sector may be associated with a second action in the LLM.

Process 400 includes retrieving (at 416) samples of the professional expressing different decisions or actions. In some embodiments, the samples include audio and video snippets of the professional. In some such embodiments, the samples represent the tone, emotions, word choice, sentence structure, length, rate, and/or other style or formatting with which the professional expresses a decision or performs an action (e.g., answers a particular type of question, explains a feature, greets others, style of questioning, etc.). The style or formatting expressed in the samples may be used to model how the LLM generates content to express a decision or action in response to the conversational elements that produced that decision or action. In some embodiments, the samples may include emails, messages, and/or other written materials that the professional generates and sends to other meeting participants before, during, or after a meeting. These other written materials provide additional examples of the professional's style or formatting (e.g., syntax, tone, sentence structure, punctuation, vocabulary, etc.).

Process 400 includes training (at 418) the LLM to generate content that models the style and format with which the professional expresses a decision or action based on the retrieved (at 416) samples. In particular, the training (at 418) includes determining a common style and format with which the professional expresses a particular decision or action in response to conversational elements that led to or preceded the particular decision or action, the stage of the workflow where the particular decision or action was made, and/or the personalities of the other meeting participants. For instance, the samples may include the professional answering a question with first content and a first style and format during a first stage of the workflow involving participants with a jovial personality after concluding discussion of a first topic, and answering the same questions with second content and a second style and format during a second stage of the workflow involving participants with an aggressive personality after concluding discussion of a second topic.

Figure 5:
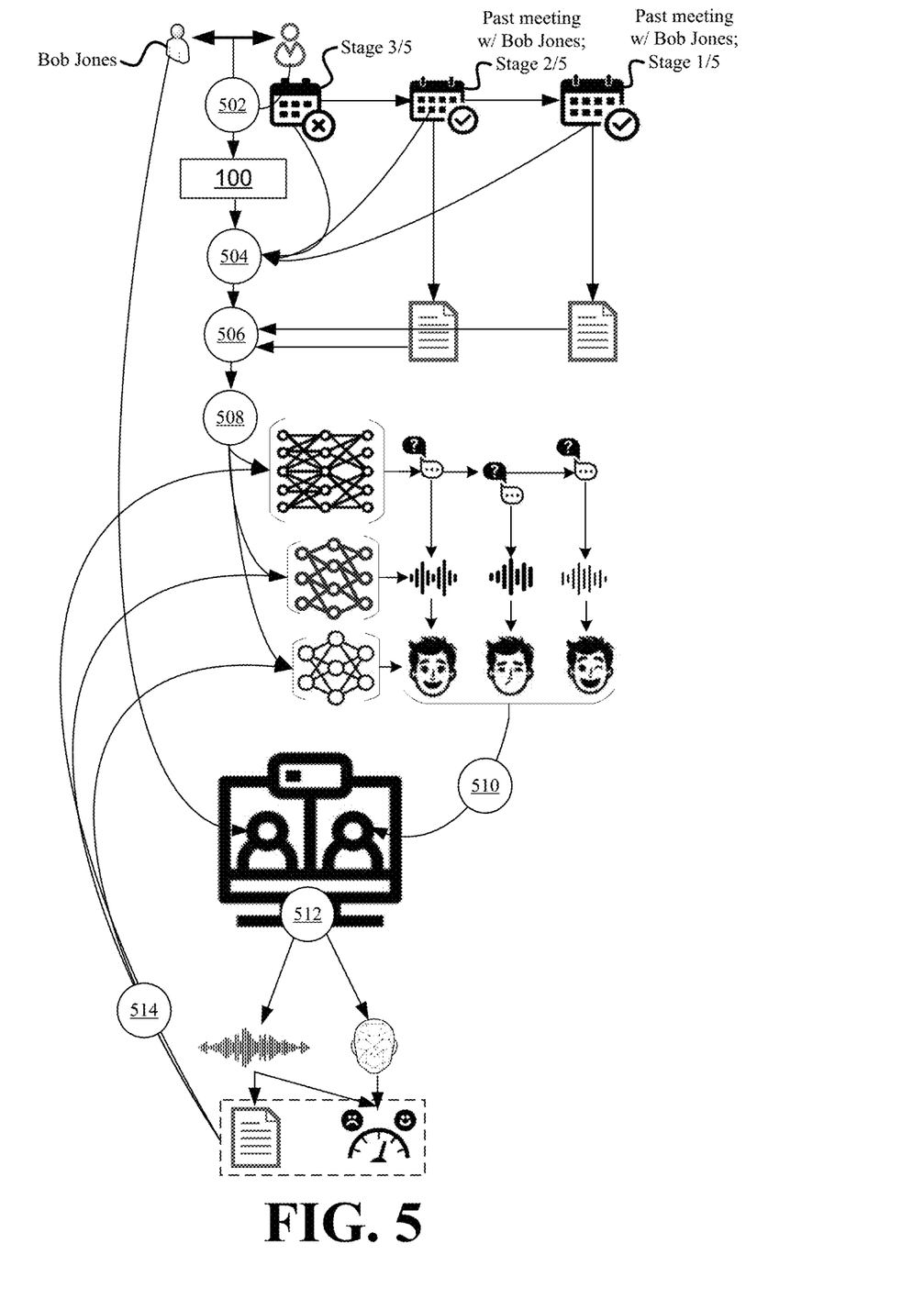
FIG. 5 illustrates an example of a live streaming AI agent interacting with other human participants in a meeting in accordance with some embodiments presented herein.

Emulation system 100 synchronizes the voice clone model, the deep fake model, and the LLM to create and present a live streaming AI agent (i.e., the autonomous bot) that actively and dynamically interacts with other human participants in a video meeting with the same speech characteristics, visual expressions, and decision-making or actions as the professional that is emulated by the live streaming AI agent. Specifically, the live streaming AI agent is generated by simultaneously executing each of the models based on data that is extracted in real-time from an active conversation or meeting. The outputs of the models are continuously combined to animate the live streaming AI agent and implement real-time generated actions for interacting with the other human participants. The real-time generated actions are generated to advance the current workflow stage towards a desired outcome. The real-time generated actions include content that the live streaming AI agent expresses through dynamically generated audio content that is modeled after speech characteristics of the professional and through dynamically generated visual representations of the professional that model the visual expressions of the professional for the content being expressed, the stage of the workflow being advanced, and the personalities of the other human participants. The simultaneous and continuous execution of the models ensures that the live streaming AI agent is not generated with discontinuity. In particular, the dynamically generated audio content, speech characteristics, and/or visual expressions do not abruptly and unrealistically transition from one range of emotions or topics to another.

FIG. 5 illustrates an example of the live streaming AI agent interacting with other human participants in a meeting in accordance with some embodiments presented herein. Emulation system 100 receives (at 502) a request to join a meeting with the live streaming AI agent representation of a particular professional whose speech characteristics, visual expressions, and decision-making and/or actions have been modeled.

Emulation system 100 obtains (at 504) meeting data to generate the live streaming AI agent with a correct initial state. The meeting data may include the names of the other human participants and information from prior meetings conducted with the other human participants. The information from the prior meetings may be used to determine the last stage of a workflow involving the other human participants, the topics or subject matter that was discussed, and the outcome or last state for the discussed topics or subject matter. The information from the prior meetings may indicate the personalities of the other human participants which may be used to adjust how the live streaming AI agent interacts with the other human participants and to continue any relationship or comradery that may have been previously established between the other human participants and the particular professional.

The live streaming AI agent is tasked with continuing or building upon relationships that the professional has with the other human participants. In order to continue or build on past relationships, emulation system obtains (at 506) relevant state from past interactions between the professional and the other human participants in earlier communications or completed stages of the workflow. The relevant state includes agreements, discussed topics (e.g., informal and formal), and/or other information exchanges between the professional and the other human participants.

Emulation system 100 provides (at 508) the meeting data and the relevant state to each of the voice clone model, deep fake model, and LLM. The models initialize the live streaming AI agent based on the provided meeting data and the relevant state. Initializing the live streaming AI agent may include generating a dynamic customized greeting for the other human participants of the meeting and training the live streaming AI agent with the context from the relevant state.

Emulation system 100 joins (at 510) the meeting with the live streaming AI agent as a participant. The live streaming AI agent is identified with the name of the professional. For a video meeting, a window is displayed to present a video feed of the live streaming AI agent that resembles a video camera capture of the professional.

As part of joining (at 510) the meeting, emulation system 100 activates the live streaming AI agent to interact with the other human participants based on synchronized execution of the models and/or synchronizing the generative content produced by the LLM with the speech characteristics produced by the voice clone model and the visual representation of the professional and modeled visual expressions produced by the deep fake clone model for the generative content. Activating the live streaming AI agent may include having the live streaming AI agent audibly and visually greet each of the other participants. The greeting may include speaking the names of the other participants and/or providing a message customized based on past interactions that the professional had with the other participants and/or based on a specialized greeting format of the professional.

Emulation system 100 monitors (at 512) the meeting in real-time. Emulation system receives audio and/or video feeds for the other participants, transcribes the audio feeds, and performs sentiment analysis on the voices and expressions of the other participants.

Emulation system 100 provides (at 514) the transcript and sentiment analysis results as inputs to the models (e.g., voice clone model, deep fake clone model, and LLM). The models continually update their outputs based on the transcript and the sentiment analysis results. Specifically, the LLM modifies the generative content in real-time to respond to questions that are asked, progress through the current workflow stage in a manner modeled after the professional (e.g., discuss or present topics or subject matter for the current workflow stage in the same format, with the same word choice, and/or at the same rate as the professional), change topics in response to the sentiment of the other participants shifting negatively, switch to a listening state when requesting input from the other participants or when the other participants begin speaking, and/or otherwise adjust decisions and actions behind the generated content so that the content interacts or engages with the other participants in a seamless and realistic manner that accurately recreates the content with which the professional interacts or engages with participants having similar personalities at the same stage of the workflow.

Emulation system 100 dynamically updates the live streaming AI agent based on the synchronized output that the models generate in response to the newly provided transcripts and sentiment analysis results. Specifically, the LLM generates new content to respond to ongoing activity in the meeting including new statements from the other human participants and/or changing sentiment of the human participants. The voice clone model and the deep fake clone model then synchronize the speech characteristics and the visual expressions of the live streaming AI agents based on the newly generated content that is presented through the live streaming AI agent.

Emulation system 100 seamlessly integrates the autonomous bot (e.g., live streaming AI agent) within existing business workflows. The seamless integration allows for the various models created for the autonomous bot to be repurposed or applied for other content generative tasks or stages of the workflow that do not involve live interactions between the professional and the other human participants. For instance, the models may be used to generate emails, messages, or other content (e.g., term sheets, agreements, presentations, etc.) in the style, format, and tone of the professional.

Moreover, the training of the models to replicate any professional allows emulation system 100 and the generated autonomous bot to operate in different businesses and sectors and/or to perform different tasks associated with different workflows. In some embodiments, emulation system 100 is used to supplement and automate various operations within an investment or venture capital firm.

Figure 6:
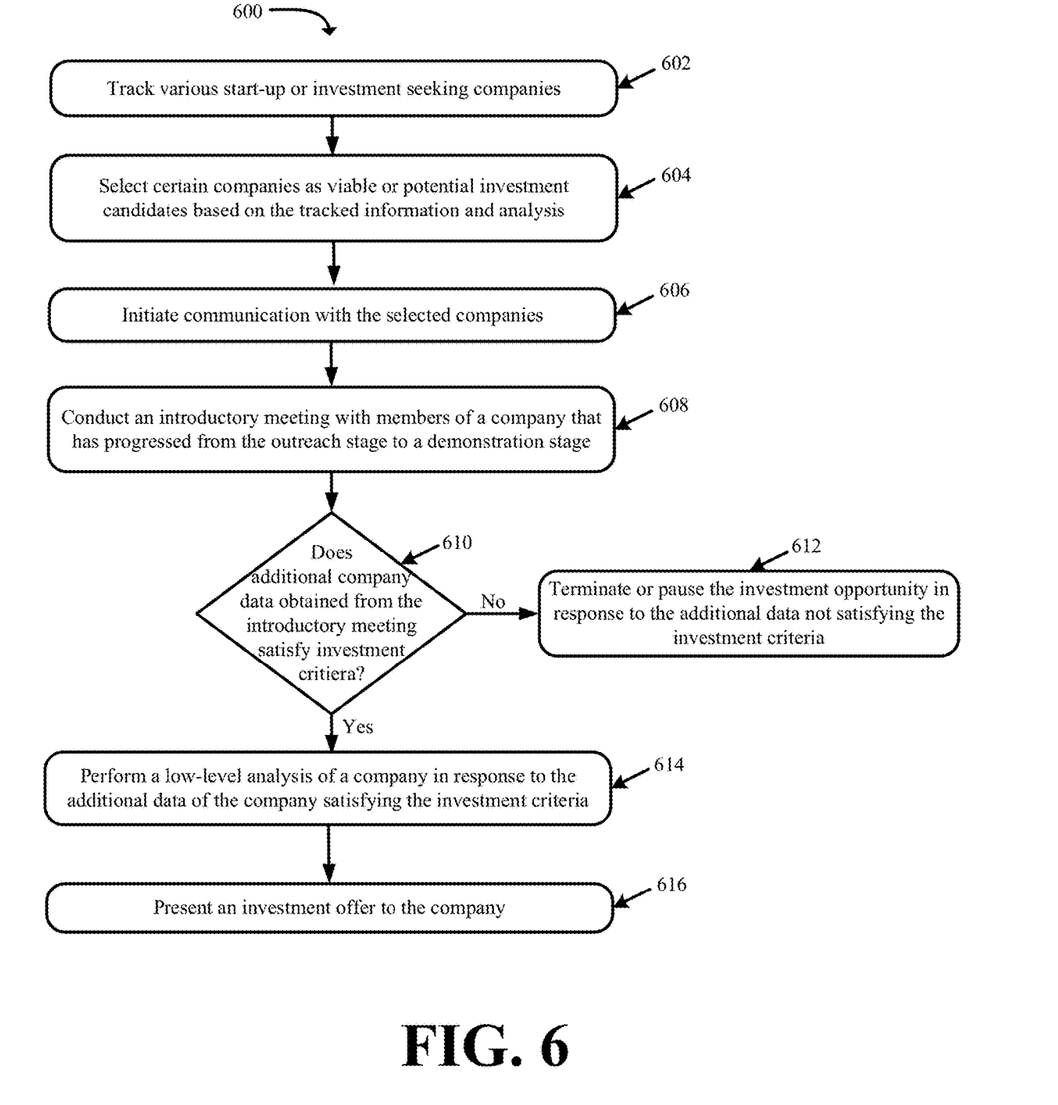
FIG. 6 presents a process for the automated and customized assistance provided for different stages of an investment or venture capture workflow in accordance with some embodiments presented herein.

FIG. 6 presents a process 600 for the automated and customized assistance provided for different stages of an investment or venture capture workflow in accordance with some embodiments presented herein. Process 600 is implemented by emulation system 100. More specifically, specific stages of the investment or venture capture workflow are performed by the autonomous bot emulating actions of a professional at those specific stages.

Process 600 includes tracking (at 602) various start-up or investment seeking companies. The tracking (at 602) may include emulation system 100 sourcing information about the companies through open-source intelligence platforms or company information aggregation sites. Emulation system 100 may use web crawlers or other automated data aggregation tools to download or obtain the company information from one or more sites. In some embodiments, the tracking (at 602) may involve emulation system 100 and/or human analysts assessing company performance and value propositions based on the sourced information.

Process 600 includes selecting (at 604) certain companies as viable or potential investment candidates based on the tracked information and analysis. In some embodiments, the selection (at 604) is performed automatically by emulation system 100 in response to the selected (at 604) companies matching or meeting criteria that is set for companies-of-interest. The selection (at 604) advances the workflow from the tracking stage to an outreach stage.

Process 600 includes initiating (at 606) communication with the selected companies at the outreach stage. For instance, an email or other electronic message may be sent to each of the selected companies to express interest in each company. Typically, the professional would conduct the outreach by drafting and sending the email or message so as to establish a relationship with each company. However, since emulation system 100 trains the models on the style, format, and content that the professional generates, emulation system 100 may query the LLM to generate the outreach email in the style, format, and content of the professional.

In some embodiments, emulation system 100 may train the LLM to generate distinct content for the autonomous bot and the outreach email. In particular, the professional may use a different style, format, and content for live person-to-person communications than for the outreach emails. Accordingly, emulation system 100 may train the LLM based on past outreach emails that were generated by the professional in order to replicate the style, format, and content used by the professional when generating the outreach email on behalf of the professional. For instance, the professional may have a personalized style in which the professional describes their background and defines specific strengths that they may provide to the business in order to build a relationship with the targeted company. The LLM may detect patterns in the professional's outreach emails in order to generate the outreach emails on behalf of the professional with the personalized background and strength descriptions. In some embodiments, the outreach email that is automatically generated by emulation system 100 is sent to the professional for review. The professional may edit the outreach email before sending to the company. The edits may create a feedback loop by which emulation system 100 may improve the accuracy of the outreach emails generated by the LLM. For instance, emulation system 100 may receive the revised or edited outreach email of the professional being sent to the targeted company, and may enter the revised or edited outreach email as additional training data for the style, format, and content of the professional's outreach messaging.

In some embodiments, the outreach stage is complete once a response is received from a company that indicates they wish to open discussions. In some embodiments, the outreach stage is complete if no response is received after an additional number of outreach communications or if a response is received that indicates that the company is not interested in furthering discussions. Accordingly, emulation system 100 may generate additional but different outreach communications on behalf of the professional to send via different communication channels or platforms.

Process 600 includes conducting (at 608) an introductory meeting with members of a company that has progressed from the outreach stage to a demonstration stage by expressing an interest in furthering discussions after receiving an outreach communication. The introductory meeting may be scheduled so that the value of the investment or venture capital firm may be explained to the interested company. The introductory meeting may include the professional and/or other team members that may drive the call on behalf of the professional. If the professional is unavailable, emulation system 100 may generate and present the live streaming AI representation of the professional during the introductory meeting to continue building upon the relationship between the professional and the members of the interested company, wherein the relationship is first established by way of the outreach communication. The live streaming AI representation builds on the relationship by placing the voice and visual representation of the professional to the content of the outreach communication and by participating in the introductory meeting with the same emotional context, tone, expressiveness, mannerisms, and behaviors of the professional as were expressed in the outreach communication.

Conducting (at 608) the introductory meeting may include the live streaming AI representation of the professional or the other team members introducing themselves to the members of the interested company, asking questions to gain a better understanding of the company's products, and building a connection from which to obtain data additional data about the company that may not be publicly accessible (e.g., finances, sales decks, etc.). In some embodiments, the live streaming AI representation may defer to the other team members to steer the introductory meeting and lead the interactions with the company representatives. The presence and/or minimized interaction by the live streaming AI representation may be sufficient to continue building the relationship and demonstrate a serious interest in the company.

Process 600 includes determining (at 610) whether additional data that is obtained from a company during or after the introductory meeting satisfies investment criteria. For instance, emulation system 100 and/or team members may evaluate the additional data to determine if the company has reached certain milestones, performance benchmarks, or growth targets.

Process 600 includes terminating or pausing (at 612) the investment opportunity in response to the additional data not satisfying the investment criteria. For instance, emulation system 100 may transition the workflow from the demonstration stage to a terminated stage in response to the additional data not satisfying the milestones, performance benchmarks, or growth targets. Alternatively, emulation system 100 may transition the workflow from the demonstration stage to a nurture stage in response to the additional data indicating that the targeted company is not financially ready but is interested in resuming discussions in the future as the company evolves. The nurture stage involves periodically monitoring changes to the targeted company to determine if it should be reallocated to the terminated stage or an engagement stage.

Process 600 includes performing (at 614) low-level analysis of a company that reaches the engagement stage in response to the additional data satisfying the investment criteria. In some embodiments, performing (at 614) the low-level analysis may include requesting team-wide feedback regarding the company. As part of the requesting the team-wide feedback, emulation system 100 may generate an email or other message that is distributed to relevant members of the deal-making or investment team. The email may be sent as a quorum where initial considerations by anybody on the team can pose questions, comments, and concerns about any aspect of the company. These questions are answered throughout due diligence and the team is updated as the deal evolves and more information is explored and shared. In some embodiments, emulation system 100 may generate a second document or an investment memo. Throughout the due diligence process, the team tries to answer their outstanding questions about the business. The answers may be obtained through referral calls, third party customer interviews, and company interviews. Emulation system 100 aggregates the obtained data for the low-level analysis. Additional data may be obtained through in-person meetings with the company.

In some embodiments, emulation system 100 automates the low-level analysis via data machine-executed or AI-assisted data cleaning and preparation, cohort analysis, forecasting, visualization, and/or other automated actions performed by emulation system. With respect to the data cleaning and preparation, emulation system 100 may automate the process of cleaning data, identifying inconsistencies, and filling in missing values. This ensures that the data used for analysis is accurate and reliable. Emulation system 100 may use AI to assist in identifying and analyzing cohorts (e.g., groups of customers who share similar behaviors or characteristics). Emulation system 100 may use machine learning models to analyze historical data to forecast future trends. These predictions help businesses understand potential revenue fluctuations and plan accordingly. Additional AI features of emulation system 100 may create dynamic visualizations of the historical data and future trends, making it easier for stakeholders to comprehend complex data. The dynamic visualization may include dashboards or user interfaces that allow users to manipulate variables and see real-time effects on revenue projections.

Performing (at 614) the low-level analysis may include generating insights from the aggregated data, and training a model with questions that the professional may ask after reviewing the insights and/or aggregated data. Emulation system 100 may feed the generated questions back into the retrieval-augmented generation pipeline to pre-answer the questions. The answers may assist the team to anticipate concerns and ensure that the generated insights and aggregated data address the most critical points.

Emulation system 100 may generate a memo that incorporates the generated insights and aggregated data. The memo is an extensive document that describes the feasibility of investments, every data insight from the due diligence process, market reports, and overall thesis of the company. The memo is generated according to a desired structure or format of the professional or investment firm. Accordingly, a model may be trained based on the desired structure or format.

Process 600 includes presenting (at 616) an investment offer to the company. Emulation system 100 may automatically generate a term sheet based on the low-level analysis and terms that have been previously offered to companies in the same sector at similar stages. The term sheet may be reviewed and/or edited by the professional before being presented. The term sheet contains numerous legal clauses that outline the structure of a deal, including breakpoints and conditions that must be met for the deal to proceed. An LLM, trained on previous term sheets, deals, and public comparables, may learn the intricacies of legal language and deal terms, effectively automating the drafting process. By analyzing past deals, the LLM can identify common structures and tailor them to the specifics of the current opportunity. The financial aspects, such as valuation and breakpoints, may be calculated by running the financial data through regression models and comparisons to industry comparables. The LLM may evaluate how similar companies were valued and funded, factoring in market conditions, growth rates, and other relevant metrics. The result is a draft term sheet that incorporates both legal and financial insights, ensuring it aligns with market expectations and the specific needs of the professional and the company targeted for investment. Furthermore, the LLM may flag any potential discrepancies or areas that require human review, thus creating a seamless workflow where the bulk of the repetitive drafting is automated while ensuring critical oversight In some embodiments, presenting (at 616) the investment offer includes using the autonomous bot representation of the professional to explain or otherwise present the investment offer and/or term sheet to the members of the company being targeted for investment. The autonomous bot may interact via email or other messaging or through live audio and/or video meetings. Emulation system 100 and/or the models generating the autonomous bot may support negotiations during the presentation of the investment offer. For instance, the autonomous bot may provide data-backed justifications for key terms in the term sheet. More specifically, by leveraging public comps and financial data, the autonomous bot via the LLM may generate insights into why certain valuation multiples are appropriate or how specific deal structures have benefited similar companies in the past. The LLM may simulate potential negotiation outcomes by adjusting key variables, and may present these outcomes to the professional or other team members so that they may understand the impact of different scenarios on the deal structure and financial returns if performing the negotiations with the targeted company members. By automating these analyses, the LLM not only saves time but also ensures that the professional and their team are armed with robust data for every aspect of the deal. Additionally, the LLM can draft alternate clauses to address common negotiation points, such as liquidation preferences or anti-dilution provisions, customizing them based on industry standards and previous deals.

The LLM may continuously learn from each term sheet or investment offer negotiation, and may refine its understanding of deal structures, negotiation patterns, and legal requirements. This iterative learning improves the quality and efficiency of future term sheet automation, creating a compounding value effect over time. As the LLM becomes more adept at understanding nuances in deal-making, it may suggest innovative deal terms or structures that have worked well in similar contexts, adding strategic value beyond mere automation.

Figure 7:
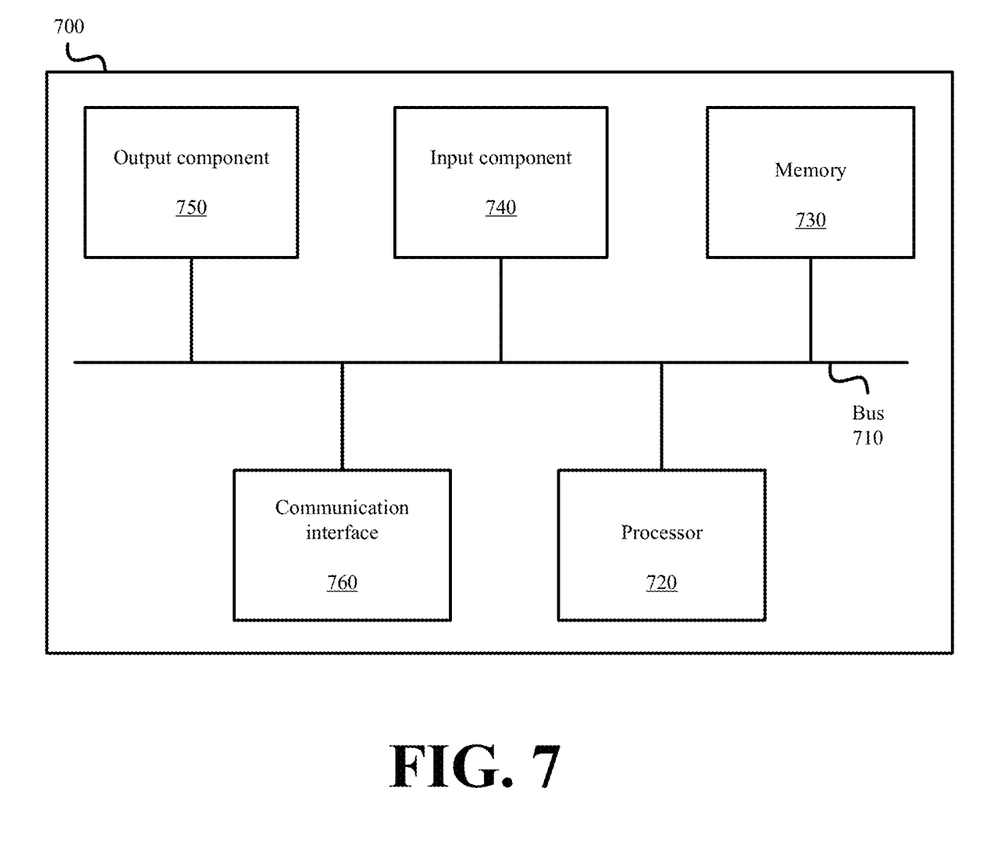
FIG. 7 illustrates example components of one or more devices, according to one or more embodiments described herein.

FIG. 7 is a diagram of example components of device 700. Device 700 may be used to implement one or more of the devices or systems described above (e.g., emulation system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    accessing feeds from a plurality of meetings involving a professional at different stages of a workflow;
    classifying a stage of the workflow associated with each meeting of the plurality of meetings;
    modeling two or more of content, speech characteristics, and visual expressions expressed by the professional at each stage of the workflow based on commonality that is detected in the feeds from a different set of the plurality of meetings classified to a corresponding stage of the workflow;
    receiving a request for a meeting with the professional and at least one other participant to discuss a particular stage of the workflow;
    determining that the professional is unavailable for the meeting;
    joining the meeting with an autonomous bot that replicates the two or more of the content, speech characteristics, and visual expressions expressed by the professional at the particular stage of the workflow based on said modeling; and
    interacting with the at least one other participant throughout the meeting using the autonomous bot as a surrogate for the professional.

2. The method of claim 1, wherein interacting with the at least one other participant comprises:
    generating a visual representation that matches a visual appearance of the professional;
    generating different content for the particular stage of the workflow based on said modeling; and
    changing the visual representation to match different visual expressions expressed by the professional in one or more of the plurality of meetings where the professional presented content related to the different content at the particular stage of the workflow to different meeting participants.

3. The method of claim 1, wherein interacting with the at least one other participant comprises:
    generating different content for the particular stage of the workflow based on said modeling; and
    replicating a voice of the professional with changing speech characteristics that match speech characteristics of the professional in one or more of the plurality of meetings where the professional presented content related to the different content at the particular stage of the workflow to different meeting participants.

4. The method of claim 1 further comprising:
    training a first model to replicate common actions of the professional at each stage of the workflow based on common content detected in the different set of the plurality of meetings classified to the corresponding stage of the workflow.

5. The method of claim 4 further comprising:
training a second model to replicate the speech characteristics of the professional at each stage of the workflow based on repeated speech characteristics detected in audio of the professional speaking in the different set of the plurality of meetings classified to the corresponding stage of the workflow.

6. The method of claim 5 further comprising:
training a third model to replicate the visual expressions of the professional at each stage of the workflow based on repeated visual expressions detected in video of the professional from the different set of the plurality of meetings classified to the corresponding stage of the workflow.

7. The method of claim 5 further comprising:
generating, by execution of the first model, dynamic content for the autonomous bot with one or more inputs indicating the particular stage of the workflow or statements made by the at least one other participant; and
audibly presenting, by execution of the second model, the dynamic content with changing speech characteristics that replicate the speech characteristics by which the professional expresses similar content.

8. The method of claim 1 further comprising:
classifying a personality of one or more participants in the plurality of meetings; and
wherein said modeling comprises:
determining first speech characteristics with which the professional expresses specific content to participants classified with a first personality in a first set of the plurality of meetings classified to the particular stage of the workflow; and
determining different second speech characteristics with which the professional expresses the specific content to participants classified with a second personality in a second set of the plurality of meetings classified to the particular stage of the workflow.

9. The method of claim 8, wherein interacting with the at least one other participant comprises:
classifying the at least one other participant with the second personality; and
audibly presenting content to the at least one other participant during the meeting via the autonomous bot with the different second speech characteristics in response to classifying the at least one other participant with the second personality.

10. The method of claim 1, wherein interacting with the at least one other participant comprises:
presenting dynamically generated first content with first speech characteristics in response to the particular stage of the workflow corresponding to a first stage of the workflow and modeling the first speech characteristics for the first stage of the workflow; and
presenting dynamically generated second content with different second speech characteristics in response to the particular stage of the workflow corresponding to a second stage of the workflow and modeling the different second speech characteristics for the second stage of the workflow.

11. The method of claim 1, wherein modeling the speech characteristics comprises:
determining a first pitch or tone with which the professional expresses a set of emotions to participants having a first personality; and
determining a different second pitch or tone with which the professional expresses the set of emotions to participants having a different second personality.

12. The method of claim 1,
wherein said modeling comprises:
determining a first set of speech characteristics and visual expressions expressed by the professional to the at least one other participant in one or more completed meetings from the plurality of meetings; and
wherein said interacting comprises:
generating audio and video for the autonomous bot that replicates the first set of speech characteristics and visual expressions for content expressed through the autonomous bot in the meeting.

13. The method of claim 1, wherein said interacting comprises:
monitoring a response of the at least one other participant to first content expressed with first speech characteristics by the autonomous bot during the meeting; and
dynamically presenting second content with second speech characteristics via the autonomous bot based on a modeling of content and speech characteristics expressed by the professional to the response at the particular stage of the workflow.

14. A system comprising:
one or more hardware processors configured to:
access feeds from a plurality of meetings involving a professional at different stages of a workflow;
classify a stage of the workflow associated with each meeting of the plurality of meetings;
model two or more of content, speech characteristics, and visual expressions expressed by the professional at each stage of the workflow based on commonality that is detected in the feeds from a different set of the plurality of meetings classified to a corresponding stage of the workflow;
receive a request for a meeting with the professional and at least one other participant to discuss a particular stage of the workflow;
determine that the professional is unavailable for the meeting;
join the meeting with an autonomous bot that replicates the two or more of the content, speech characteristics, and visual expressions expressed by the professional at the particular stage of the workflow based on said modeling; and
interact with the at least one other participant throughout the meeting using the autonomous bot as a surrogate for the professional.

15. The system of claim 14, wherein interacting with the at least one other participant comprises:
generating a visual representation that matches a visual appearance of the professional;
generating different content for the particular stage of the workflow based on said modeling; and
changing the visual representation to match different visual expressions expressed by the professional in one or more of the plurality of meetings where the professional presented content related to the different content at the particular stage of the workflow to different meeting participants.

16. The system of claim 14, wherein interacting with the at least one other participant comprises:

generating different content for the particular stage of the workflow based on said modeling; and replicating a voice of the professional with changing speech characteristics that match speech characteristics of the professional in one or more of the plurality of meetings where the professional presented content related to the different content at the particular stage of the workflow to different meeting participants.

17. The system of claim 14, wherein the one or more hardware processors are further configured to:

train a first model to replicate common actions of the professional at each stage of the workflow based on common content detected in the different set of the plurality of meetings classified to the corresponding stage of the workflow.

18. The system of claim 17, wherein the one or more hardware processors are further configured to:

train a second model to replicate the speech characteristics of the professional at each stage of the workflow based on repeated speech characteristics detected in audio of the professional speaking in the different set of the plurality of meetings classified to the corresponding stage of the workflow.

19. The system of claim 18, wherein the one or more hardware processors are further configured to:

train a third model to replicate the visual expressions of the professional at each stage of the workflow based on repeated visual expressions detected in video of the professional from the different set of the plurality of meetings classified to the corresponding stage of the workflow.

20. A non-transitory computer-readable medium storing program instructions that, when executed by one or more hardware processors, cause an emulation system to perform operations comprising:

accessing feeds from a plurality of meetings involving a professional at different stages of a workflow;

classifying a stage of the workflow associated with each meeting of the plurality of meetings;

modeling two or more of content, speech characteristics, and visual expressions expressed by the professional at each stage of the workflow based on commonality that is detected in the feeds from a different set of the plurality of meetings classified to a corresponding stage of the workflow;

receiving a request for a meeting with the professional and at least one other participant to discuss a particular stage of the workflow;

determining that the professional is unavailable for the meeting;

joining the meeting with an autonomous bot that replicates the two or more of the content, speech characteristics, and visual expressions expressed by the professional at the particular stage of the workflow based on said modeling; and interacting with the at least one other participant throughout the meeting using the autonomous bot as a surrogate for the professional.

* * * * *